United States Patent
Gaj-Jablonski

(10) Patent No.: US 10,605,080 B2
(45) Date of Patent: Mar. 31, 2020

(54) HYDROGEN ENGINE AND THE WAY OF HYDROGEN FUEL PRODUCTION FOR ITS POWER SUPPLY

(71) Applicant: Wojciech Gaj-Jablonski, Oakville (CA)

(72) Inventor: Wojciech Gaj-Jablonski, Oakville (CA)

( * ) Notice: Subject to any disclaimer, the term of this patent is extended or adjusted under 35 U.S.C. 154(b) by 0 days.

(21) Appl. No.: 15/756,235

(22) PCT Filed: Sep. 28, 2015

(86) PCT No.: PCT/PL2015/000157
§ 371 (c)(1),
(2) Date: Feb. 28, 2018

(87) PCT Pub. No.: WO2017/039464
PCT Pub. Date: Mar. 9, 2017

(65) Prior Publication Data
US 2018/0252105 A1 Sep. 6, 2018

(30) Foreign Application Priority Data
Aug. 31, 2015 (PL) .......................................... 413737

(51) Int. Cl.
*F01B 9/02* (2006.01)
*F02B 47/02* (2006.01)
(Continued)

(52) U.S. Cl.
CPC ................ *F01B 9/026* (2013.01); *F01B 1/08* (2013.01); *F01B 7/16* (2013.01); *F01B 9/02* (2013.01);
(Continued)

(58) Field of Classification Search
CPC ..... F01B 1/08; F01B 9/026; F01B 7/16; F01N 5/025; F02B 25/00
See application file for complete search history.

(56) References Cited

U.S. PATENT DOCUMENTS

| 6,854,429 B2 | 2/2005 | Gelfand | |
|---|---|---|---|
| 9,010,287 B2 * | 4/2015 | Morreim | F02B 75/002 123/53.6 |
| 2003/0145809 A1 | 8/2003 | Janhunen | |

FOREIGN PATENT DOCUMENTS

| CN | 101445940 | 6/2009 |
|---|---|---|
| CN | 101680310 A | 3/2010 |

(Continued)

OTHER PUBLICATIONS

International Search Report for PCT/PL2015/000157, Completed by the European Patent Office dated May 13, 2016, 6 Pages.
(Continued)

*Primary Examiner* — Kevin A Lathers
(74) *Attorney, Agent, or Firm* — Own Innovation; James W. Hinton

(57) ABSTRACT

A combustion engine having a pair of two-chamber cylinders, in which double ended pistons are located and directed toward themselves oppositely by the angle 180° and compressed together via crankshafts consisting of two crank elements, which are linked rotationally backward by a spacer bearing. The compression is realized with the use of two connecting rod pairs, from which each connecting rod is linked on the one side to with one crank element, whereas the second connecting rod ends are linked to one of shafts, out of which each shaft is connected with one of pistons via a valve rod. In the middle of each cylinder's wall the outlet channel of compressed air is located as well as the outlet channel of products of combustion together with air. In the head of each cylinder and in the compartment the fuel
(Continued)

injector, the water vapor injector and the ignition element are located.

6 Claims, 4 Drawing Sheets

(51) Int. Cl.
| | |
|---|---|
| *F01N 5/02* | (2006.01) |
| *F02B 75/24* | (2006.01) |
| *F02B 33/32* | (2006.01) |
| *F02B 75/00* | (2006.01) |
| *F01B 7/16* | (2006.01) |
| *F02M 25/00* | (2006.01) |
| *F01N 5/04* | (2006.01) |
| *F02B 25/00* | (2006.01) |
| *F02M 25/038* | (2006.01) |
| *F02B 75/28* | (2006.01) |
| *F02B 75/32* | (2006.01) |
| *F01B 1/08* | (2006.01) |
| *F02B 43/10* | (2006.01) |
| *F02M 25/12* | (2006.01) |
| *F02B 75/02* | (2006.01) |

(52) U.S. Cl.
CPC .............. *F01N 5/025* (2013.01); *F01N 5/04* (2013.01); *F02B 25/00* (2013.01); *F02B 33/32* (2013.01); *F02B 47/02* (2013.01); *F02B 75/002* (2013.01); *F02B 75/24* (2013.01); *F02B 75/282* (2013.01); *F02B 75/32* (2013.01); *F02M 25/00* (2013.01); *F02M 25/038* (2013.01); *F02B 2043/106* (2013.01); *F02B 2075/025* (2013.01); *F02M 25/12* (2013.01); *Y02E 60/324* (2013.01); *Y02T 10/121* (2013.01); *Y02T 10/16* (2013.01)

(56) References Cited

FOREIGN PATENT DOCUMENTS

| | | |
|---|---|---|
| CN | 104033244 | 9/2014 |
| GB | 145206 | 7/1920 |
| GB | 256631 | 11/1927 |
| JP | 2001522427 A | 11/2001 |
| PL | 212301 | 9/2012 |
| WO | 9849434 | 11/1998 |
| WO | 0181743 | 11/2001 |
| WO | 0250410 | 6/2002 |

OTHER PUBLICATIONS

Chinese National Intellectual Property Administration, Office Action for Chinese Patent Application No. 201580084128.3, dated Jan. 17, 2020.

* cited by examiner

HYDROGEN ENGINE AND THE WAY OF HYDROGEN FUEL PRODUCTION FOR ITS POWER SUPPLY

CROSS-REFERENCE TO RELATED APPLICATION

This application is the U.S. national phase of PCT Application No. PCT/PL2015/000157 filed on Sep. 28, 2015, which claims priority to PL Patent Application No. P.413737 filed on Aug. 31, 2015, the disclosures of which are incorporated in their entirety by reference herein.

TECHNICAL FIELD

The object of the innovation is the hydrogen engine and a method of hydrogen fuel production for its power supply that is intended to be used in the operation of land vehicles, aerial vehicles and water vehicles, as well as in various kinds of machinery.

BACKGROUND

The combustion engine, known from patent description U.S. Pat. No. 6,854,429, has a piston which operates on either of its two sides, and contains at least one cylinder with a double symmetrical piston located inside, which in turn divides the free space of the cylinder into two combustion chambers. Cylinder heads at both ends of the cylinder are equipped with fuel/air mixture intake valves and exhaust discharge valves, as well as with an ignition element in the form of a spark plug or an incandescent plug. At one end, the double piston is firmly affixed to a push-rod which passes through one of the cylinder heads utilizing a sealed slot in a cylinder head which separates the cylinder compartment from the rest of the engine casing. The end of this push-rod is connected to a stabilizer yoke, which in turn is connected to a power transfer yoke. Where these two yokes are connected together, there is a further connection to a stabilizer arm which is in turn connected at its opposite end by a pin link to the engine casing The other side the power transfer yoke is connected to the crankshaft, which constitutes a part of the powertrain, and has a flywheel affixed to it at one end, and a timing wheel, connected via a timing belt to a camshaft, on its other end. The engine lubrication system consists of an oil circulation system which supplies oil to the moving parts within the cylinder under pressure, provided by an oil pump drawing from the engine oil sump, through an opening in the side wall of the cylinder in the part of the cylinder that, during engine operations, is traversed by the reduced diameter section of the double-sided piston acting within the cylinder. The oil subsequently enters the reduced diameter section of the double-sided piston though an opening in its surface, and then travels through a passage that is internal to the double-sided piston and its firmly affixed push-rod, and exits from an opening in the side of the push-rod that is external to the cylinder, and then travels back to the oil sump. The camshaft is connected at one end to the powertrain by a timing belt, and its rotating cams operate valve lifter rods, which in turn operate either valve rockers which in turn operate the intake and exhaust valves, or directly operate the valve intake and exhaust valves. These valve operations are synchronized, by way of the operation of the timing belt and the geometry of the camshaft lobes, to the operational requirements of the engine. The engine operates in a four-stroke cycle where pistons in adjacent cylinders operate alternate to each other such that a two cylinder engine would apply force to the powertrain every 180 degrees of crankshaft rotation.

Moreover, the piston and crank engine powertrain system is known from patent description PL 212301 of the two-stroke combustion engine, which has a crankshaft casing with a built-in linking guide and a cylinder which is attached to the guide. The guide is attached to the cylinder at the center of its base, and the piston vertically reciprocates within the cylinder. The piston is attached to a connecting rod which traverses the guide at the base of the cylinder as compelled to do so by the actions of the piston in the cylinder. Affixed to the connecting rod traveling within the guide is a sealing ring, similar in performance to a piston ring, which prevents oil from transferring between the crankcase and the cylinder. Additionally, in a variant of the known piston and crank system the connecting rod is connected by a telescoping linkage to a secondary shaft which is then connected to an external rotating element through a slide bearing. On the external side of the slide bearing, the reciprocating secondary rod is attached to a wheel, at some distance from its center of rotation, that is affixed to the drive axle, which subsequently powers a drive wheel which in turn powers a chain drive. The secondary rod is connected to the wheel affixed to the drive axle by way of a linkage which translates the reciprocating motion of the secondary rod to the rotational motion of the wheel that is affixed to the drive axle.

Furthermore, the internal combustion engine known from patent description U.S. Pat. No. 6,918,382, by which an engine is powered by hydrogen fuel is used to power a motor scooter using measured quantities of hydrogen. The hydrogen fuel management system employed controls the quantity of fuel injected into the engine, which in turn controls the engine output power. The hydrogen fuel management system controls fuel injection based upon multiple inputs, inclusive of the amount of hydrogen that remains in the fuel storage tank, which is monitored with the assistance of a hydrogen fuel measurement system that is operated by a microcontroller and whose input are appropriate on board sensors.

SUMMARY

The method of producing hydrogen fuel using an HHO generator is known, and consists of electrical power produced by an alternator and supplied to the HHO generator, after which electrolysis of water sourced from a tank on the vehicle occurs, resulting in the creation of a non-explosive mixture of hydrogen and oxygen. This product is directly input into the engine fueling system, along with additional air and regular motor fuel. This known technique reduces the quantity of fuel used in the combustion engine, but does not eliminate it.

According to the invention, the engine has one pair of two-chamber cylinders which are attached to the engine casing, in which two-sided reciprocating pistons are located, and the cylinders together with pistons are attached facing each other either on directly opposite sides of the engine casing with the crankshaft located in the engine casing between the two cylinders, or they may be aligned in the form of a letter "V" and connected to the engine casing, within which is found the crankshaft, at the base of the V-shape. The crankshaft consists of two identical crank elements, which are located such that they are exactly in line with each other and adjacent to each other, and further rotate in opposite directions and are separated by a spacer bearing. Moreover, the ends of each crankshaft opposite to the spacer bearing exit the engine casing and provide rotating elements for attachment to the further powertrain. The two-sided reciprocating pistons are attached to the crankshaft by way of a rigidly attached push rod shaft, which is further rigidly attached to a transverse shaft, which is further rigidly attached to a pair of identical connecting-rods, which in turn are connected to a crankshaft lobe at some distance from the crankshaft itself by a linkage which accepts power from the oscillating motion of the connecting-rods and converts it to the rotational motion of the crankshaft. The opposite end of each push rod shaft is firmly connected to the two sided piston within the cylinder, and enter one end of each cylinder head by way of a linear bearing through each cylinder head that is located most closely to the engine casing in which the crankshaft is located. The linear bearing contains a sealing annular element which is located adjacent to the slide bearing on the crankcase side of the linear bearing, and above which, between the internal slide bearing wall and the surface of the push rod shaft is found a micro channel for the purposes of lubrication. In the middle of the wall of each cylinder, whose internal surface is made of, covered or impregnated with an anticorrosive surface or coating, is found a pair of transverse openings that enable a pressurized flow of air to enter the cylinder, and on the opposite side allow for the products of combustion and residual water to exit the cylinder. Within each of the opposing pairs of cylinder heads are located three openings through the cylinder head through which are tightly inserted, threaded, or otherwise firmly affixed the fuel injector, the water vapor injector and the ignition element. The water vapor injectors for each cylinder are connected by appropriate hoses or piping to a device for dispensing correct water vapor quantity, and this device is supplied with water vapor from a water vapor generator mounted on the exhaust pipe and harvesting heat from the exhaust for this purpose. Each exhaust pipe is equipped with thermo electric generators that take advantage of the temperature differential between the exhaust gases and the ambient atmosphere, and a turbine within the exhaust gas flow which powers the pressurization of input air to the hydrogen engine. The electrical outputs from the alternator and any other generators of electricity that may be present are connected in parallel with the output from the thermo electric generators and are connected to a battery, which supplies electrical power to the HHO generator. The HHO generator oxygen production offtake gas pipe connects to an ultraviolet ionizer, and from there further connects to one of the intake inlets to the three-way gas mixer, while the hydrogen production offtake gas pipe from the HHO generator connects directly to the other gas intake inlet on the 3-way gas mixer. The 3-way gas mixer outlet is connected to a small gas compressor and then connected in parallel, through all of the inlet lines, to the fuel feeders, and then to each of the fuel injectors.

The method of producing hydrogen fuel according to the invention, includes the disassociation of water into hydrogen and oxygen by the process of electrolysis using an HHO generator, and then ionizing the subsequently obtained oxygen in order to increase energy potential of each atom by means of electron supplementation in the outermost electron shell of each atom up to total of 8 electrons. Ionized oxygen is then combined with hydrogen from the HHO generator, and the subsequently obtained gas mixture is then transferred to the engine as fuel through the fueling system.

An advantage of the engine, according to the invention, is the use of water vapor in the cylinder to significantly reduce the levels of pollutants in the engine exhaust gas stream, along with the low cost of providing this end result Moreover, as a result of using two-chamber cylinders with directly opposed two-sided piston orientations and operation, as well as a valveless air management system and and a power management system that links together all of the pistons via the divided crankshaft, the elimination of significant vibrations in the engine block has been obtained, together with a very good power ratio of power to mass. The result is a relatively lightweight engine given its power output.

An advantage of the hydrogen engine stems from the innovation that is the application of the features of the valveless engine together with the known solution of the engine with the double piston internal to the cylinder, which divides the free space of each of the two cylinders into two combustion chambers, in which two work cycles occur during one full turn of the crankshaft. A second benefit is the complete separation of the cylinder combustion chambers from the crank space casing, which prevents oil from being transferred from the crank shaft casing to the combustion products that are exhausted, as well as preventing any residual water in the combustion chamber from comingling with the oil or other products in the crank case casing. Additionally, as the hydrogen engine displays enhanced internal cooling, there is no need to employ the generally used resonant exhaust system, which further reduces the emission of pollutants and improves engine efficiency.

BRIEF DESCRIPTION OF THE DRAWINGS

FIG. 5 shows the compression cycle in the lower combustion chamber and the scavenging stroke in the upper combustion chamber, whereas

DETAILED DESCRIPTION

Figure 1:
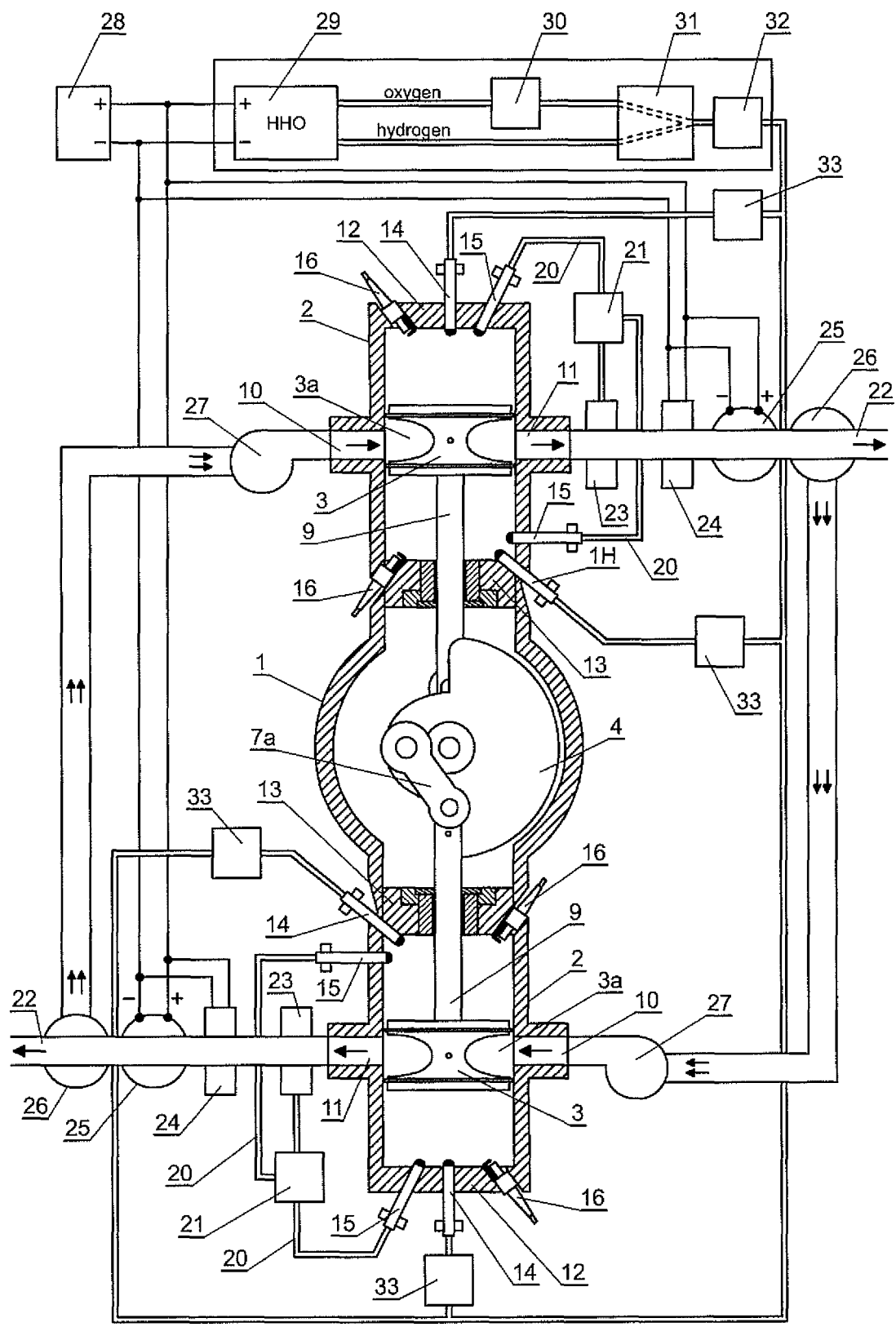
FIG. 1 shows a cross sectional schematic of the hydrogen two-cylinder engine.
Figure 2:
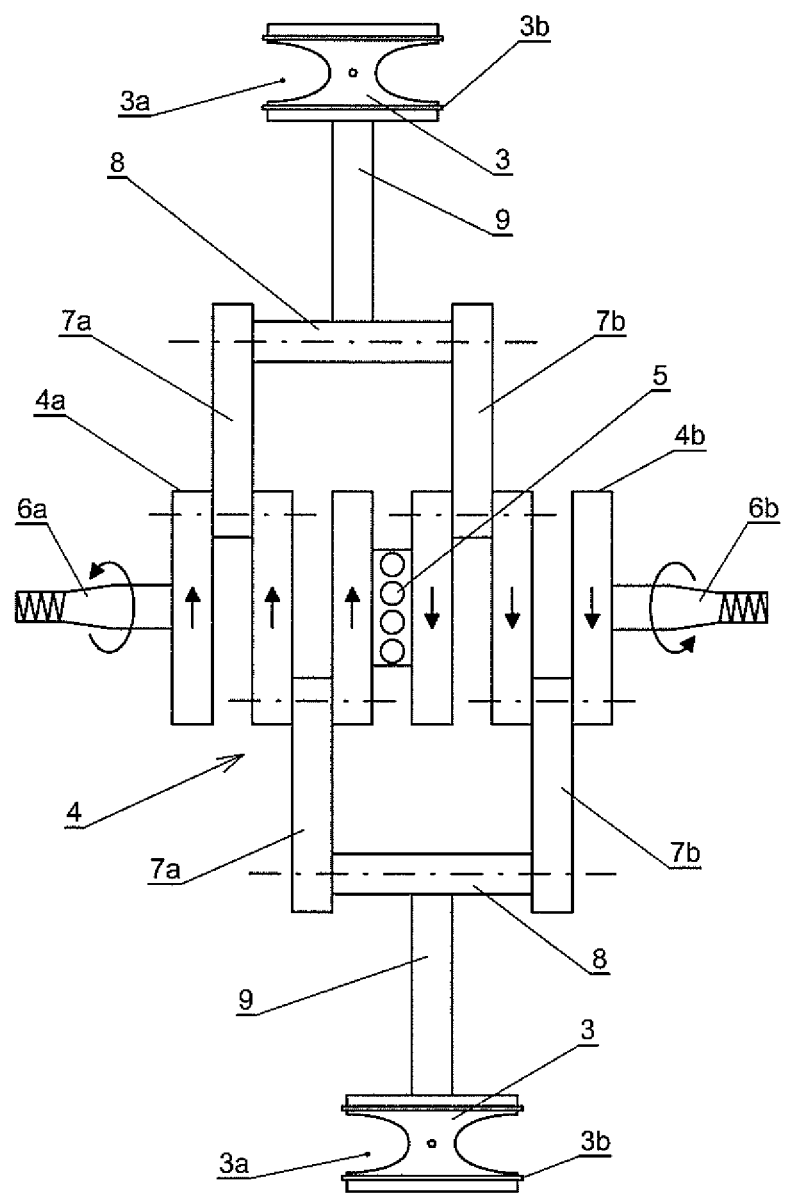
FIG. 2 shows an explanatory diagram of the divided crankshaft with pistons and connecting members, while, also for explanatory purposes, on the remaining drawings following, the hydrogen engine work cycle is shown on cross sectional diagrams which detail the action of a piston in one of the cylinders and its interactions with the crankshaft assembly.

The engine has one pair of two-chamber cylinders 2 attached to the casing 1, in each of which one two-sided reciprocating piston 3 is located, and the cylinders 2, together with the pistons 3 are attached facing each other on directly opposite sides of the engine casing 1 in the plane of the rotational axis of the divided crankshaft 4 whose two component parts work together in unity and are situated in the casing 1. Each piston 3 has one externally sculped hollowed surface 3*a* between the piston rings at the midpoint of the face of its cylindrical lateral surface. The crankshaft 4 is comprised of two identical crank elements 4*a* and 4*b*, which are located such that they are exactly in line with each other along a common rotational axis and they are connected together such that they may rotate in opposite directions around this axis through the spacer bearing 5. The ends of the crankshaft 4 have shafts 6a and 6b on either side which exit the casing 1 and transfer rotational energy to the further powertrain. The conjoined action of the crank elements 4a and 4b acting in unity as crankshaft 4 is achieved through the action of two identical connecting-rod pairs 7a and 7b, where each connecting-rod 7a and 7b of a given pair is linked at one end to one of counter-rotating shaft elements 4a and 4b of the crankshaft 4 and acts upon it to impart rotational movement, and the other end of this pair of connecting-rods is connected to one of two transverse shafts 8, and where the opposite end of each transverse shaft 8 is rigidly connected with one two-sided reciprocating piston 3 via the perpendicular push rod shaft 9. Each push rod shaft 9, which is at one end rigidly connected to one of the pistons 3 and at the other end rigidly connected to one of a pair of two connecting-rods 7a and 7b by way of its rigid connection to the transverse shaft 8, provides rotational power to crank shaft element 4a and 4b such that crank shaft element 4a rotates in the opposite direction of crank shaft element 4b. In the longitudinal middle of the wall of each cylinder 2, whose internal surface is covered with a diamond coating, the inlet port 10 for pressurized air to enter into cylinder 2 is located, and directly opposite inlet port 10 is located the outlet port 11 for the products of combustion. In the outer head 12 of each cylinder 2 and in the inner head of each cylinder 13 are located the fuel injector 14, the water vapor injector 15 and the ignition element, in the form of an ignition plug 16. In the middle of each inner cylinder head 13 is embedded the linear slide bearing 17, through which the push rod shaft 9 moves longitudinally. The slide bearing 17 is sealed from the inner side with the annular sealing ring 18, above which on the remaining part of the slide bearing 17, between its wall and the surface of the push rod shaft 9, the lubricating micro slot 19 is formed. Water vapor injectors 15, that are located on cylinder head 12, are connected by their water vapor piping 20 to the device for dispensing the appropriate quantity of water vapor at the appropriate time 21, and which is sourced through piping from the water vapor generator 23 that is mounted on the exhaust pipe 22. Furthermore, on each exhaust pipe 22 the thermo electric generator 24 is installed, and within the exhaust pipe 22 are located the generator turbines 25 and booster air fan turbine 26, which moves air through ducting to the main fan 27 and then through further ducting to the inlet port 10 of cylinder 2. Electricity produced from all of the generator turbines 25 is linked in parallel to electricity produced by all of the thermo electric generators 24 and they are further connected to the battery 28, which augmented by electricity from the alternator, which is not shown on these drawings, supplies electrical energy to the HHO generator 29. The oxygen offtake gas pipe from the HHO generator 29 connects with the ultraviolet ionizer 30, and from there leads to one of inlets of the three-way gas mixer 31, while the hydrogen production offtake gas pipe from the HHO generator 29 connects directly with the other gas intake inlet on the 3-way gas mixer 31. The outlet of the 3-way gas mixer 31 is connected to a small gas compressor 32 and then connected in parallel, through the feeder lines, to all of the inlets of the individual fuel feeders 33 and then to each of the fuel injectors 14 in the engine that they are associated with.

The engine, according to the invention, is supplied with the mixture of hydrogen and ionized oxygen. The principal element of the system is the HHO generator 29, in which electrolysis of water, extracted from the water tank, which is not shown in the drawing, takes place. This water is appropriately pretreated to optimize the process of electrolysis. Electric energy needed for electrolysis is provided from the battery 28 and further assisted by electricity from all of the thermo electric generators 24, turbine generators 25 and the alternator, which is not illustrated in the drawing. From the HHO generator, electrolysis products are derived in the form of oxygen and hydrogen, and oxygen is further processed through an ultraviolet ionizer 30, where its energy potential is enhanced, after which it is combined with hydrogen in the 3-way gas mixer 31, after which the mixture of gases undergoes compression in the compressor 32 and then, under very high pressure, it is transferred to all of the fuel feeders 33. The fuel feeders, whose operation is controlled by a processor that is not shown on the diagrams, provides gaseous fuel at appropriate instances of time to the appropriate fuel injector 14.

The engine's cycle of operations is identical for both cylinders 2 as they operate conjointly to offset each other. Further, owing to the diametrically opposing nature of the engine's geometry, the working cycles of the two cylinders are phase shifted by an angle of 180°. Consequently, in order to simplify the description, it is sufficient to focus on the operation of only one of the cylinders 2 and its respective piston 3, and how this operation is coordinated with the balance of the engine's direct and supporting components.

Figure 3:
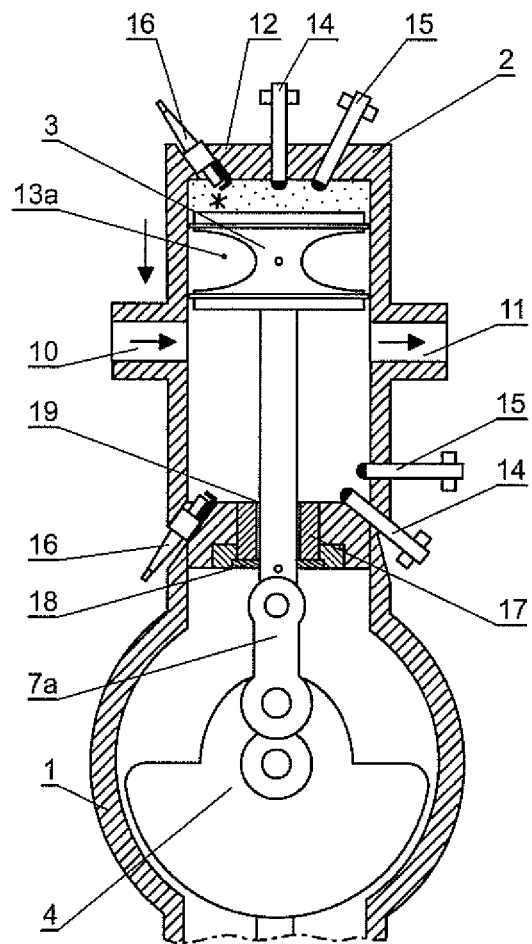
FIG. 3 shows the compression stroke in the upper combustion chamber and the scavenging stroke in the lower combustion chamber.
Figure 4:
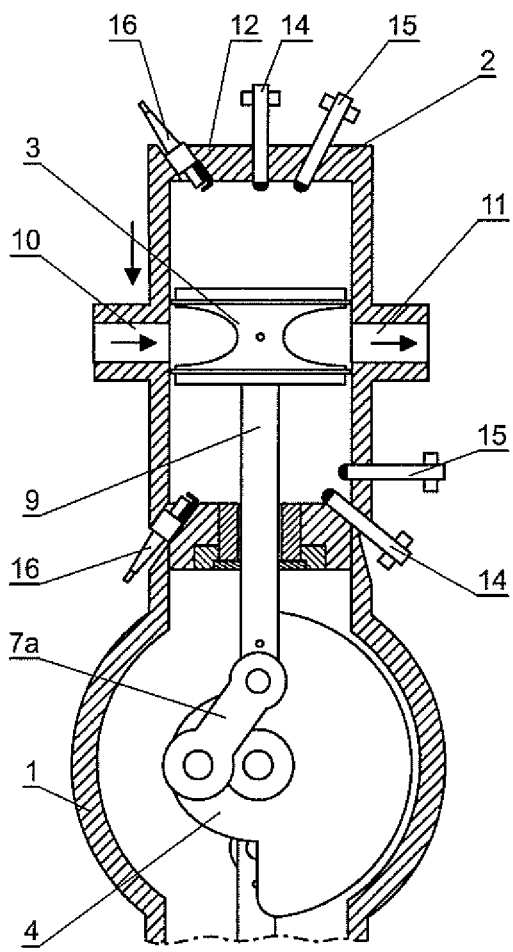
FIG. 4 shows the cylinder at the end of the power portion of the stroke in the upper combustion chamber with the piston at the cylinder midpoint and moving towards the lower combustion chamber, as well as the injection of fuel into the lower combustion chamber.
Figure 5:
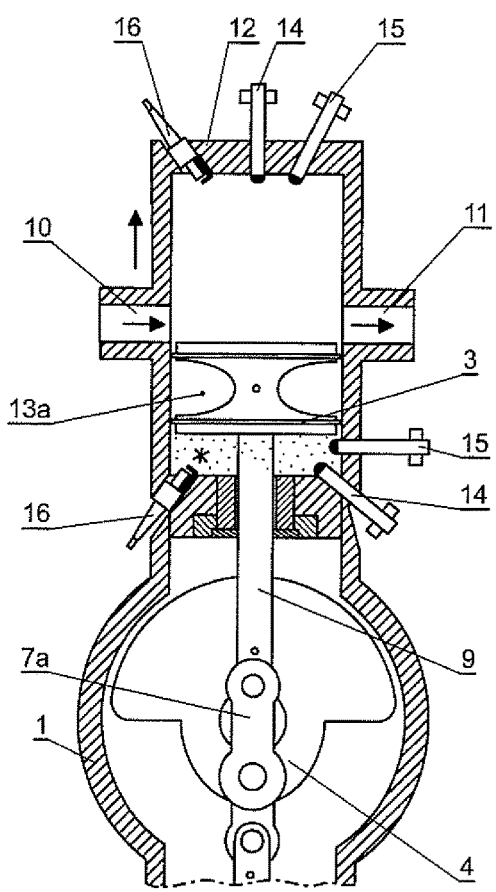
Figure 6:
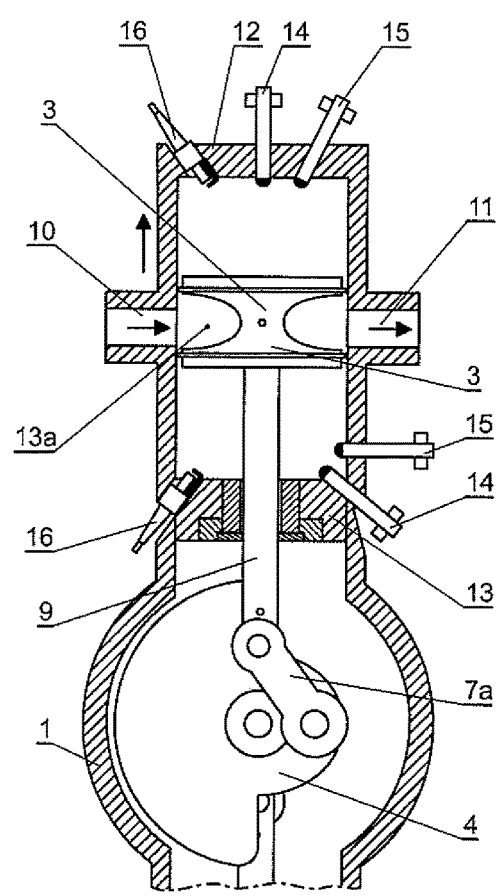
FIG. 6 shows the cylinder at the end of the power portion of the stroke in the lower combustion chamber with the piston at the cylinder midpoint and moving towards the upper combustion chamber as well as the injection of fuel into the upper combustion chamber.

Compressed hydrogen fuel is supplied to the cylinder's 2 upper chamber above the piston 3, which constitutes the upper combustion chamber. Near the maximal point of compression, fuel ignition, initiated by the spark of the ignition plug, takes place, as shown in FIG. 3. At the moment when the highest temperature, of around 7000° C., is achieved in the upper combustion chamber, a jet of water vapor is injected into the upper combustion chamber via the water vapor injector 15, which leads to the chamber being cooled by up to 3500° C., and due to the high temperature to which the water vapor is heated in the upper combustion chamber, the simultaneous decomposition of water vapor into oxygen and hydrogen occurs. The emergence of this fuel mixture in the combustion chamber, that was derived in the aforementioned way results in, due to the remaining temperature in the upper combustion chamber, an immediate reignition of the hydrogen and oxygen mixture and thus the enhancement of pressure, and thus work, in the upper combustion chamber of cylinder 2. In the course of the described combustion processes the power stroke of the piston 3 occurs as it is forced down towards the crankshaft 4. At the time when the piston 3 is situated at the axis of the inlet port for pressurized air 10 and the outlet port for the products of combustion and residual water, pressurized air washes over and cools the externally sculpted hollowed surface 3a of piston 3 as well as the cylinder's 2 surface located between the sealing rings 3b. Pressurized air used for this purpose is delivered from the inlet port 10, which is in turn sourced from the main fan 27, and the latter is supplemented by air sourced from the booster fan 26 that is driven by the kinetic energy of exhaust gases, which in turn travel through the exhaust pipe. Additionally, in this phase of the engine's work, fuel from the lower fuel injector 14 is injected into the cylinder 2 lower combustion chamber under the piston 3, which constitutes the lower combustion chamber, as presented in the FIG. 4. In the course of the further downward movement of the piston 3 toward the crankshaft 4, the fuel air mixture undergoes compression. Subsequently, the inlet port for pressurized air 10 as well as the outlet port for products of combustion and residual water 11 are opened by the movement of piston 3 to allow the release of the exhaust products from the upper combustion chamber of cylinder 2, and as a consequence pressurized air which is supplied to the upper combustion chamber of the cylinder 2 pushes out the remaining combustion products. As the piston 3 approaches the maximum compression point in the lower combustion chamber, as shown in FIG. 5, the fuel air mixture now present and compressed is ignited in the lower combustion chamber through the use of a spark provided by the ignition plug in that combustion chamber, followed by the injection of water vapor into the lower combustion chamber through the water vapor injector 15, which subsequently is disassociated into oxygen and hydrogen, and whose energetic recombination, together with the combustion of the fuel air mixture present in the lower combustion chamber, powers the upward motion of the power stroke of the piston 3 toward the crankshaft 4. At the instance when the piston 3 moves upward such that the middle of piston 3 is on the axis of the inlet port for pressurized air 10 and the outlet port for the products of combustion together with residual water 11, pressurized air washes over and cools the externally sculpted hollowed surface 3a of piston 3 as well as the cylinder 2 surface situated between sealing rings 3b. Additionally, fuel from the upper fuel injector 14 is injected into the cylinder 2 upper combustion chamber above the piston 3, which is illustrated in FIG. 6. As piston 3 moves further upward, the compression of fuel occurs in the upper combustion chamber of the cylinder 2 and simultaneously the lower combustion chamber of the cylinder 2 is ventilated with pressurized air supplied through the inlet port for pressurized air 10, which is depicted in FIG. 3. At this point, the engine cycle is repeated. The source of water vapor for the engine is the water vapor generator 23, mounted on the exhaust pipe 22, from which water vapor is supplied to water vapor injectors 15 through devices for dispensing the appropriate quantity of water at the appropriate time 21, which are in turn controlled by a processor synchronized to the engine work cycle. The purpose of employing the thermo electric generators 24 mounted on the exhaust pipe 22 and the turbine generators 25 driven by exhaust gases in the exhaust pipe 22 is to gain maximal recovery of both thermal and mechanical energy from the exhaust gases and to use it to generate electrical power for storage in the battery 28, which in turn is the main electrical power repository for electricity to power the electrolysis of water in the HHO generator 29.

The engine, according to the invention, has broad application in the operation of vehicles, including aerial and water vehicles. The counter rotating work performed by the engine through crank elements 4a and 4b of the crankshaft 4 and output shafts 6a and 6b for power transmission may be particularly used in two-impeller helicopters. In this case it is possible to attach impellers directly onto the two counter-rotating shafts of the crank elements, and as a consequence of which the gyroscopic moment of the impellers is eliminated, and further, this drive system does not require the use of reversal gearing, which in turn increases total system efficiency.

Furthermore, an additional application in which the engine, according to the invention, could be used would be as a drive mechanism for ships and submarines, as one of the fueling sources is water, which is in abundance for any such watercraft. In particular, unmanned aerial vehicles used in marine environments, may find this additional fuel source to be beneficial.

Another equally significant economic advantage of the engine, according to the invention, is the opportunity to use it in the ecological production of electric power, as well as heat, in both smaller and larger power plants, especially in rural and semi urbanized areas.

The invention claimed is:

1. A hydrogen engine comprising:
   a casing with at least two cylinders attached to it, which are closed on their outermost end by the cylinder head and on their innermost end by a cylinder head that separates the cylinder from the crankcase, whereas inside each cylinder there is a two-sided reciprocating piston with piston rings, which divides the internal space of the cylinder into two combustion chambers, with a push rod shaft rigidly affixed to the side of the reciprocating piston that faces the crankcase, and whose end exits the cylinder by way of a linear slide bearing in the cylinder head that separates the cylinder from the crankcase, and in each cylinder head there are located three openings through which are tightly inserted, threaded or otherwise firmly affixed the fuel ignition element, the hydrogen and other fuel injection element, and the water vapor injection element, and the engine has control systems to manage the hydrogen and other fuels injection, and wherein this engine configuration has at least one pair of two-chamber cylinders fastened to the crankcase, and in which two-sided reciprocating pistons are situated, while these cylinders along with pistons can be mounted to the crankcase such that they are diametrically opposed to each other, or offset from each other by an angle of 180° and perpendicular to the rotational axis of the divided crankshaft, or they may be aligned in the form of a letter "V" and connected to the engine casing within which is found the crankshaft such that the engine casing and crankshaft are found at the vertex of the letter "V", and whereas the crankshaft consists of two identical crank elements, which are located such that they are exactly in line with each other and immediately adjacent to each other, and further rotate in opposite directions and are separated by a spacer bearing, and the crankshaft has output shafts at either end which exit the crankcase and thus provide external rotating elements to which further powertrain elements are capable of being attached, and the crankshaft is powered by the push rod shafts which are rigidly attached at one end to the reciprocating pistons and are rigidly attached at their other end to a transverse shaft which in turn is rigidly attached to a pair of connecting-rods, where each connecting-rod is connected by a link to a crankshaft lobe at a distance from the crankshaft itself and takes work done by the reciprocating motion of the reciprocating piston, which is rigidly connected to the push rod shaft which exits the cylinder through the slide bearing and connects to the transverse shaft which connects to the pair of connecting-rods, and through the connecting links converts the reciprocating motion to the rotational motion of the crankshaft, and
   in the middle of each cylinder's wall, whose internal surface is made of, covered or impregnated with anti-corrosive resistance, is located at least one inlet port for pressurized air and at least one outlet port, to expel the products of combustion together with excess air and residual water, that is located on the cylinder wall opposite the inlet port, and in the middle of each inner cylinder head is mounted a linear slide bearing, through which the push rod shaft transitions from the cylinder to the crankcase of the engine, and the slide bearing is sealed from the crankcase side of the engine with an annular sealing ring, next to which on the remaining part of the slide bearing, between its wall and the surface of the push rod shaft, a lubricating micro slot is formed.

2. The engine according to claim 1, wherein each piston has on its side surface, between the upper and lower set of piston rings, at least one externally sculpted hollow.

3. The engine according to claim 2, wherein water vapor injectors assigned to each cylinder are connected by their water vapor piping to the devices for dispensing water vapor, which is sourced from the water vapor generator mounted on the exhaust pipe of a cylinder.

4. The engine according to claim 1, wherein water vapor injectors assigned to each cylinder are connected by their water vapor piping to the device for dosing, that is dispensing the appropriate quantity of water vapor, at the appropriate time, water vapor which is sourced from the water vapor generator mounted on the exhaust pipe exiting from a cylinder.

5. The engine according to claim 4, wherein on each exhaust pipe exiting the cylinders is mounted a thermo electric generator and within each exhaust pipe are mounted booster turbines, which supply pressurized air to the main air turbine to provide pressurized air to the inlet port of each cylinder, while the thermo electric generators provide power to the battery, which supplies electrical energy to the HHO generator, where the oxygen gas off take pipe from this generator feeds an ultraviolet ionizer, and from which the now ionized oxygen is further supplied to one of inlets of the three-way gas mixing valve, to which the hydrogen gas off take pipe from the HHO generator supplies to the second inlet of the three-way gas mixing valve, and where the outlet of the three-way gas mixing valve is connected to the inlets of all the individual fuel dispensers by way of a small compressor and subsequently the outlets of all of the individual fuel dispensers are each connected with their respective fuel injector into one of the engine combustion chambers.

6. The engine according to claim 5, wherein the oxygen and hydrogen derived from the water electrolysis in the HHO generator are combined after enhancing the energy potential of the oxygen atoms through an ionization process that causes ultraviolet radiation to impact on the outermost electron shell of each oxygen atom thereby creating the ionized oxygen.

\* \* \* \* \*